(12) United States Patent
Vannithamby et al.

(10) Patent No.: US 9,237,478 B2
(45) Date of Patent: Jan. 12, 2016

(54) DISCONTINUOUS RECEPTION (DRX) RECONFIGURATION

(71) Applicants: Rath Vannithamby, Portland, OR (US); Ali Koc, Hillsboro, OR (US); Maruti Gupta, Portland, OR (US); Satish Jha, Hillsboro, OR (US)

(72) Inventors: Rath Vannithamby, Portland, OR (US); Ali Koc, Hillsboro, OR (US); Maruti Gupta, Portland, OR (US); Satish Jha, Hillsboro, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/125,592

(22) PCT Filed: Aug. 5, 2013

(86) PCT No.: PCT/US2013/053589
§ 371 (c)(1),
(2) Date: Dec. 12, 2013

(87) PCT Pub. No.: WO2014/022847
PCT Pub. Date: Feb. 6, 2014

(65) Prior Publication Data
US 2015/0201375 A1 Jul. 16, 2015

Related U.S. Application Data

(60) Provisional application No. 61/679,627, filed on Aug. 3, 2012.

(51) Int. Cl.
*H04W 28/02* (2009.01)
*H04W 52/00* (2009.01)
(Continued)

(52) U.S. Cl.
CPC ....... *H04W 28/0221* (2013.01); *H04L 41/0836* (2013.01); *H04L 43/0811* (2013.01);
(Continued)

(58) Field of Classification Search
None
See application file for complete search history.

(56) References Cited

U.S. PATENT DOCUMENTS

2007/0291673 A1 12/2007 Demirhan et al.
2008/0051101 A1 2/2008 Ha et al.
(Continued)

FOREIGN PATENT DOCUMENTS

| EP | 1 499 144 A1 | 1/2005 |
| WO | 2011/085802 A1 | 7/2011 |
| WO | 2014/022847 A1 | 2/2014 |

OTHER PUBLICATIONS

International Search Report and Written Opinion received for PCT Patent Application No. PCT/US2013/053589, mailed on Nov. 27, 2013, 10 pages.
(Continued)

*Primary Examiner* — Ashley Shivers
(74) *Attorney, Agent, or Firm* — Thorpe North & Western

(57) ABSTRACT

Technology for communicating a discontinuous reception (DRX) reconfiguration is disclosed. In one method, a preferred power consumption configuration message is received, at an evolved node B (eNB) from a user equipment. The preferred power consumption configuration message may be a one-bit message using a first Boolean value to indicate a preferred power consumption configuration. A DRX reconfiguration request message may be received, from the UE, to reconfigure a DRX configuration of the UE to reduce a power consumption level of the UE. The DRX reconfiguration request message may be the one-bit message using a second Boolean value to indicate a DRX reconfiguration. The eNB may determine to reconfigure the DRX configuration of the UE based on the DRX reconfiguration request message. In addition, the eNB may perform the DRX reconfiguration at the UE by adjusting one or more parameters of the DRX configuration.

24 Claims, 9 Drawing Sheets

(51) Int. Cl.

| | | |
|---|---|---|
| *H04W 76/04* | (2009.01) | |
| *H04W 24/04* | (2009.01) | |
| *H04W 24/02* | (2009.01) | |
| *H04N 21/2343* | (2011.01) | |
| *H04N 21/258* | (2011.01) | |
| *H04W 40/02* | (2009.01) | |
| *H04L 12/24* | (2006.01) | |
| *H04L 12/26* | (2006.01) | |
| *H04L 29/08* | (2006.01) | |
| *H04W 4/00* | (2009.01) | |
| *H04W 16/18* | (2009.01) | |
| *H04W 52/02* | (2009.01) | |
| *H04W 16/28* | (2009.01) | |

(52) U.S. Cl.
CPC .......... *H04L 67/16* (2013.01); *H04N 21/23439* (2013.01); *H04N 21/25825* (2013.01); *H04W 4/005* (2013.01); *H04W 16/18* (2013.01); *H04W 24/02* (2013.01); *H04W 24/04* (2013.01); *H04W 40/02* (2013.01); *H04W 52/00* (2013.01); *H04W 52/0209* (2013.01); *H04W 52/0216* (2013.01); *H04W 76/048* (2013.01); *H04W 16/28* (2013.01); *Y02B 60/50* (2013.01)

(56) References Cited

U.S. PATENT DOCUMENTS

| | | | |
|---|---|---|---|
| 2010/0165899 A1 | 7/2010 | Van Bosch et al. | |
| 2011/0243047 A1* | 10/2011 | Dayal | H04W 16/14 370/311 |
| 2012/0320791 A1* | 12/2012 | Guo et al. | 370/254 |
| 2014/0018085 A1* | 1/2014 | Young et al. | 455/450 |

OTHER PUBLICATIONS

Catt, "Analysis of UE Assistance Information for eDDA", 3GPP TSG RAN WG2 R2-122159, May 2012, pp. 5, Meeting 78, Agenda 7.2.1, Prague Czech Republic.

Ericsson et al, "Further Discussion on UE-Supported DRX Configuration", 3GPP TSG-RAN WG2 R2-121517, Mar. 2012, pp. 4, Meeting 77bis, Agenda 7.2.1, Jeju South Korea.

Office action for Korean application 2014-7037025, dated Aug. 12, 2015, 10 pages including English translation.

* cited by examiner

```
DRX-Config ::=                        CHOICE {
    release                               NULL,
    setup                                 SEQUENCE {
        onDurationTimer                       ENUMERATED {
                                                  psf1, psf2, psf3, psf4, psf5, psf6,
                                                  psf8, psf10, psf20, psf30, psf40,
                                                  psf50, psf60, psf80, psf100,
                                                  psf200},
        drx-InactivityTimer                   ENUMERATED {
                                                  psf1, psf2, psf3, psf4, psf5, psf6,
                                                  psf8, psf10, psf20, psf30, psf40,
                                                  psf50, psf60, psf80, psf100,
                                                  psf200, psf300, psf500, psf750,
                                                  psf1280, psf1920, psf2560, psf0-v1020,
                                                  spare9, spare8, spare7, spare6,
                                                  spare5, spare4, spare3, spare2,
                                                  spare1},
        drx-RetransmissionTimer               ENUMERATED {
                                                  psf1, psf2, psf4, psf6, psf8, psf16,
                                                  psf24, psf33},
        longDRX-CycleStartOffset              CHOICE {
            sf10                                  INTEGER(0..9),
            sf20                                  INTEGER(0..19),
            sf32                                  INTEGER(0..31),
            sf40                                  INTEGER(0..39),
            sf64                                  INTEGER(0..63),
            sf80                                  INTEGER(0..79),
            sf128                                 INTEGER(0..127),
            sf160                                 INTEGER(0..159),
            sf256                                 INTEGER(0..255),
            sf320                                 INTEGER(0..319),
            sf512                                 INTEGER(0..511),
            sf640                                 INTEGER(0..639),
            sf1024                                INTEGER(0..1023),
            sf1280                                INTEGER(0..1279),
            sf2048                                INTEGER(0..2047),
            sf2560                                INTEGER(0..2559)
        },
        shortDRX                              SEQUENCE {
            shortDRX-Cycle                        ENUMERATED {
                                                  sf2, sf5, sf8, sf10, sf16, sf20,
                                                  sf32, sf40, sf64, sf80, sf128, sf160,
                                                  sf256, sf320, sf512, sf640},
            drxShortCycleTimer                    INTEGER (1..16)
        }       OPTIONAL                                            -- Need OR
    }
}

-- ASN1STOP
```

FIG. 5

DISCONTINUOUS RECEPTION (DRX) RECONFIGURATION

RELATED APPLICATIONS

The present application claims priority to U.S. Provisional Patent Application No. 61/679,627, filed Aug. 3, 2012, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the Third Generation Partnership Project (3GPP) Long Term Evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 5 illustrates an abstract syntax notation (ASN) code example of various discontinuous reception (DRX) parameters in accordance with an example;

Figure 1:
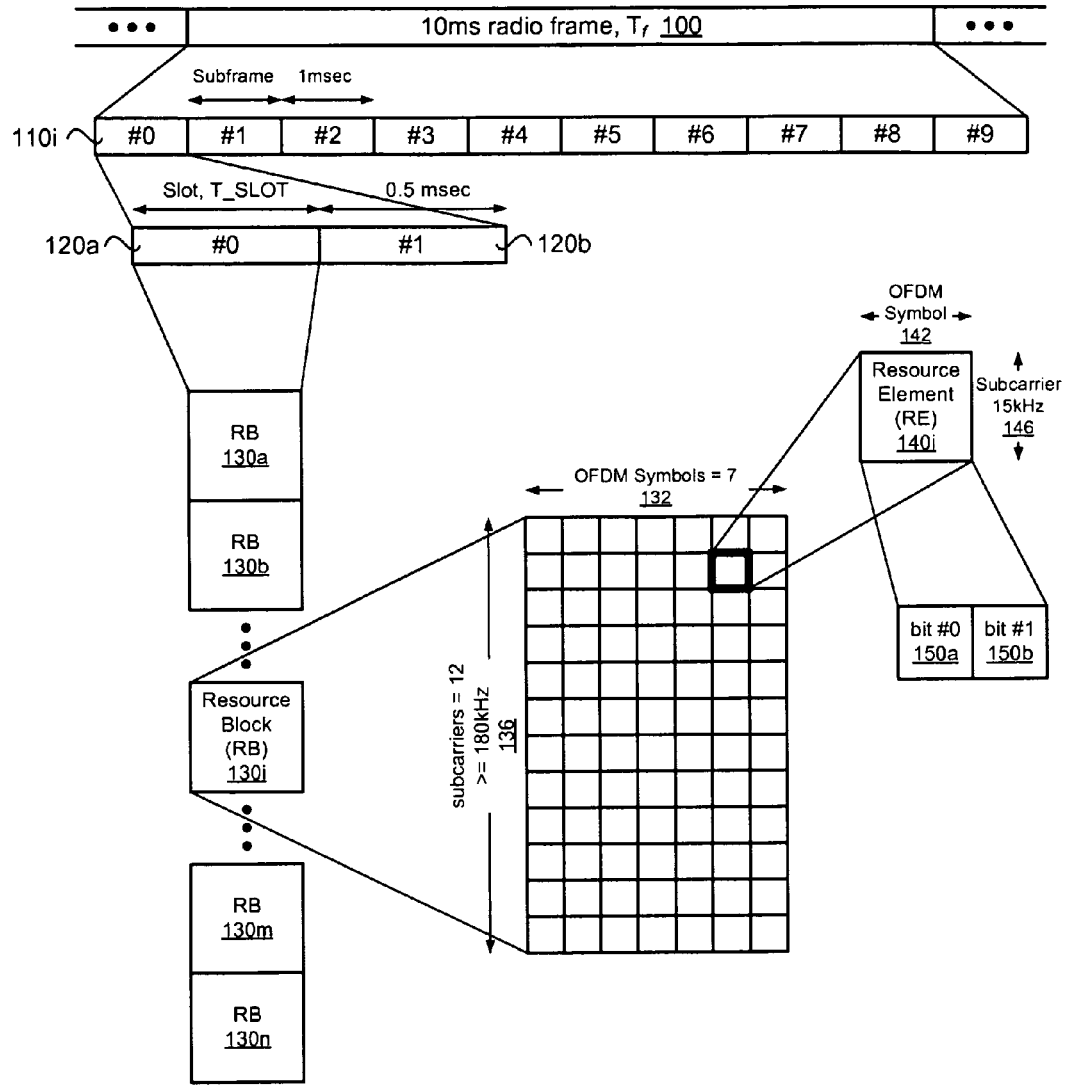
FIG. 1 illustrates a block diagram of an orthogonal frequency division multiple access (OFDMA) frame structure in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

Definitions

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

In a wireless wide area network (WWAN), such as the Third Generation Partnership Project (3GPP) Long Term Evolution (LTE) network Release 8, the concept of discontinuous reception (DRX) was introduced for saving power. DRX can be used to enable a wireless device, such as a user equipment (UE) in a 3GPP LTE network, to discontinuously monitor a control channel, such as the physical downlink control channel (PDCCH) communicated from a transmission station such as an enhanced NodeB (eNodeB). The discontinuous monitoring can provide significant power savings at the UE since the receiver at the UE can be turned off.

In one example, a WWAN transceiver in a wireless device can communicate with a transmission station, referred to as a network node, to negotiate time periods in which the wireless device will receive communications from the network node. During the negotiated times when information is not received, the wireless device can turn its receiver off and enter a low power state. Discontinuous reception is used in a number of different wireless communication standards, including but not limited to 3GPP LTE Rel. 8, 9, 10, 11 and 12, and the Institute of Electrical and Electronics Engineers (IEEE) 802.11 standard.

In the 3GPP LTE standard, a set of functionalities are provided to enable an LTE configured receiver in a UE to perform sleep events. These sleep events may last anywhere from a single millisecond to hundreds of milliseconds or longer. The duration and timing of the sleep events can be negotiated between the UE and the network node. The negotiation may be performed using high level signaling, such as an Open Systems Interconnection (OSI) level 3 communication or another type of high level signaling. One example of an OSI level 3 communication in the 3GPP LTE standard is radio resource control (RRC) signaling. In the LTE standard, RRC signaling is used to control DRX operations at the LTE configured transceiver in the UE.

A brief description of the frame structure of the 3GPP LTE standard is provided herein as a reference. FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the transmitting station and the receiving station can include multiple resource blocks (RBs) 130$a$, 130$b$, 130$i$, 130$m$, and 130$n$ based on the CC frequency bandwidth. The CC can have a carrier frequency having a bandwidth and center frequency. Each RB (physical RB or PRB) 130$i$ can include 12-15 kHz subcarriers 136 (on the frequency axis) and 6 or 7 orthogonal frequency-division multiplexing (OFDM) symbols 132 (on the time axis) per subcarrier. The RB can use seven OFDM symbols if a short or normal cyclic prefix is employed. The RB can use six OFDM symbols if an extended cyclic prefix is used. The resource block can be mapped to 84 resource elements (REs) 140$i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

The network node in the 3GPP LTE standard is a node with which the UE has set up at least one component carrier. The network node may be a full power eNodeB, referred to as a macro node. Alternatively, the UE may be in communication with a low power node such as a femto node, pico node, or home eNodeB (HeNB). The UE may also communicate with a macro node or low power node via a relay node.

A UE can be set in either an RRC_IDLE or an RRC_CONNECTED state to extend battery life while still guaranteeing a high quality of service (QoS) and connectivity speed. The 3GPP LTE implementation allows the UE to reduce the amount of time spent monitoring a control channel, such as the PDCCH, for control channel information. Rather than monitoring the PDCCH every transmission time interval (TTI), the UE can monitor the PDCCH only during specific time intervals set through the RRC communication. An Active Time is a time related to DRX operation during which the UE monitors the PDCCH in PDCCH-subframes. This solution can provide benefits in both the downlink and uplink because all of the scheduling control information is transmitted on the PDCCH. During non-active states, the UE can be configured to enter a power saving state that can significantly decrease the power consumption of the LTE configured radio frequency modem at the UE, thereby reducing interference at collocated radios at the UE.

The RRC signaling can be used to manage the use of DRX by setting various parameters. Examples of parameters that can be set in the RRC_CONNECTED state are illustrated in the following table.

| DRX Parameter | Description |
| --- | --- |
| DRX Cycle | Identifies the periodic repetition of an active period, identified as an "On Duration", followed by a possible period of inactivity. There is a DRX Long cycle and a DRX Short cycle. |
| On Duration timer | Identifies how many subframes the UE is in an active state when a new DRX cycle starts (at the beginning of a DRX cycle). The UE will listen to the PDCCH subframes during this time even if there is no data transfer. |
| DRX Inactivity timer | Identifies for how many consecutive PDCCH subframes the UE is to remain active after successfully decoding a PDCCH. |
| DRX Retransmission timer | Identifies a maximum number of consecutive PDCCH subframes in which the UE should remain active to wait for an incoming retransmission after a first available retransmission time. Can be used for asynchronous HARQ. |
| DRX Short Cycle | Identifies a periodic repetition of an active state when the UE is under a short DRX condition. |
| Short DRX Cycle timer | Specifies a consecutive number of subframes the UE will follow the short DRX cycle after the DRX inactivity timer has expired. |
| UL Retransmission Timer | Identifies number of subframes during which the UE shall monitor PDCCH when an UL grant for retransmission is expected. Timer is triggered 4 subframes after UL transmission. |
| DL Retransmission Timer | Identifies period during which the UE remains awake when retransmissions are expected on the PDSCH. |

When the network configures DRX for a UE, a value is defined for the DRX Inactivity Timer, referred to in the 3GPP LTE Technical Specification (TS) 36.321 as a drx-Inactivity Timer that starts running after each data block has been sent. If new data is sent then the timer is restarted. If still no data is sent when the timer expires then the device can enter a DRX mode with a short DRX cycle. This means that the UE will effectively sleep and awake in a relatively short pattern based on the short DRX cycle. If new data is received then it can be received relatively quickly since the UE only sleeps for short periods. The short DRX cycle mode also has a configurable short DRX cycle timer (i.e. drxShortCycleTimer) attached. Once this timer expires (i.e. no data is received during the short cycle mode), the UE can enter the long DRX cycle. The long DRX cycle can further reduce power usage, but also increases latency time.

During the inactivity periods, the UE may only check the control channels and resources may be assigned. In each DRX cycle (short and long), the RF modem can be turned on for a number of consecutive subframes set by the On Duration timer to listen to the control channel. When data activity is detected, in either the downlink or uplink, the eNodeB triggers the short DRX cycle for the UE, thereby increasing the responsiveness and connectivity of the UE. The transitions between the Long DRX Cycle and the Short DRC cycle may be triggered directly by the eNodeB or determined by a timer. Control channel information received on the PDCCH can identify resource blocks in which data is communicated to the UE, thereby enabling the UE to receive the data transmitted in the downlink.

The inactivity timer can specify the consecutive number of TTIs during which the UE will monitor the PDCCH after successfully decoding a PDCCH indicating an uplink or a downlink data transfer for the UE. The inactivity timer can keep the UE awake for a certain period during data transfer even if the on-duration timer has expired. In a downlink, the inactivity timer is usually triggered within an on-duration period. If the on-duration period is longer, the inactivity timer may start and expire within the awake period. In this example, the inactivity timer will not contribute to the average awake time of the terminal. The inactivity timer may only be triggered for new transmissions in both an uplink and downlink and not for retransmissions.

Figure 2A:
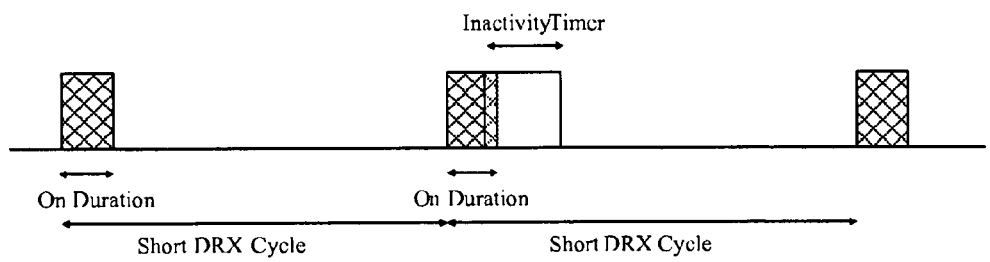
FIG. 2a illustrates a block timing diagram that includes a short discontinuous reception (DRX) cycle in accordance with an example

FIG. 2a illustrates one example of DRX parameters. In this example, a short DRX cycle starts at the beginning of an On Duration and ends at the beginning of the next On Duration. An Inactivity Timer is shown overlapping an On Duration, as discussed in the preceding paragraph.

Another DRX feature is related to power saving during HARQ retransmissions. For example, when a UE fails to decode a transport block of a HARQ active process, the UE assumes that the next retransmission will take place after a DRX retransmission timer. This allows the UE to enter a power saving state without the need to listen to the PDCCH.

In the 3GPP LTE specification, a HARQ round trip time (RTT) timer can be started after 1 ms (for decoding delay) of the PDCCH indicating a downlink shared channel (PDSCH) transmission. The HARQ RTT timer can be started for every downlink shared channel transmission.

Figure 2B:
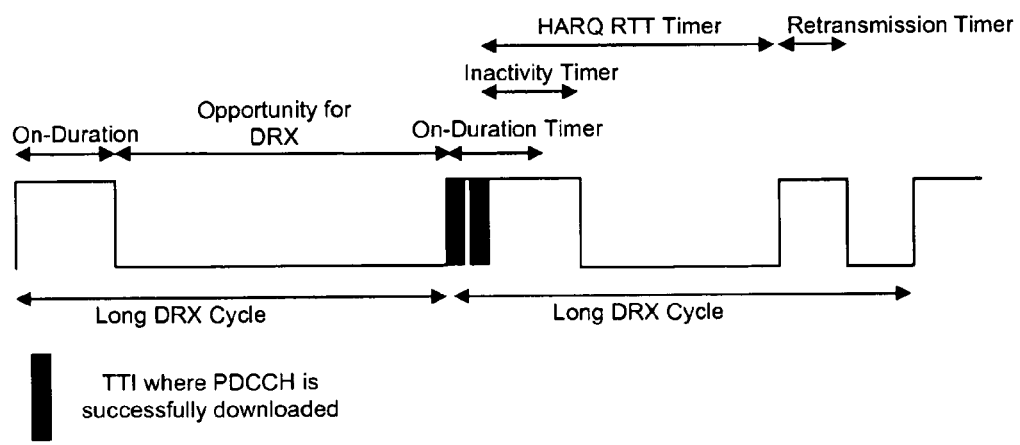
FIG. 2b illustrates a block timing diagram that includes a long DRX cycle in accordance with an example

FIG. 2b illustrates an example of a long DRX cycle. In this example, the long DRX cycle is shown relative to an On-Duration Timer, an overlapping Inactivity Timer, a HARQ RTT timer, and a retransmission timer. The HARQ RTT timer is started after the decoding delay of the PDCCH.

In 3GPP Release 11, enhancements for diverse data applications (eDDA) are related to improving power efficiency of device and signaling overhead over an air interface while supporting diverse data applications in LTE. In one example, the UE may communicate a power preference indication (PPI) to an evolved node B (eNB). The PPI may be one-bit UE assistance information that improves the UE's power efficiency in the context of background traffic. In other words, the UE may communicate its preferred power consumption configuration (i.e., PPI information) to the eNB. The preferred power consumption configuration of the UE may be a default power consumption configuration or a lower power consumption configuration. The default power configuration may represent a preferred UE power configuration that is optimized for active traffic, such as delay sensitive applications. An active traffic session may include a time period when a user is actively interacting with the UE. The lower power consumption configuration may represent a preferred UE power configuration that is optimized for device power saving and is suitable for background traffic. A background traffic session may represent the duration when the user is not directly interacting with the UE. During the background traffic session, applications may run in the background and generate updates, notifications, etc.

In response to the UE communicating the preferred power consumption configuration to the eNB, the eNB may set or establish the UE's power consumption configuration. In one example, the UE may not communicate the same preferred power consumption configuration as previously communicated to the eNB until expiry of a timer (e.g., T340). In other words, after expiry of the timer, the UE may communicate the same preferred power consumption configuration as previously communicated to the eNB.

The DRX configuration of the UE may depend on whether the UE is operating in the default power consumption configuration or the lower power consumption configuration. For example, the UE may request a default DRX configuration from the eNB when operating in the default power consumption configuration. Similarly, the UE may request a lower power DRX configuration from the eNB when operating in the lower power consumption configuration. In one example, the eNB may grant the UE's request to transition into the default DRX configuration or the lower power DRX configuration.

The DRX configuration may include various parameters, such as an inactivity timer, ON duration, short cycle, long cycle, number of consecutive short cycles before entering a long cycle, etc. The DRX configuration parameters may determine the amount of power saving that the UE may achieve.

In one example, the low power DRX configuration may include a shorter inactivity timer, a smaller number of short DRX cycle repetitions before the long DRX cycle starts, and longer long DRX cycles. As a result, the UE may transition into a DRX sleep mode quicker and for a longer period of time, thereby saving UE battery life. When data packets arrive at the eNB, while the UE is in the DRX sleep mode, the data packets may be buffered until the UE is awake. In addition, the DRX buffering that results from the longer DRX cycles may lead to increased end-to-end packet delay.

The default DRX configuration may reduce the degradation of delay performance that may occur when the UE uses the lower power DRX configuration. For example, the default DRX configuration may include a longer inactivity timer (i.e., to send the UE into the DRX sleep mode less often), a higher number of short DRX cycle repetitions (i.e., to keep the UE in light sleep more frequently), and a shorter length of long DRX cycles (i.e., to reduce the maximum buffering delay when the UE is asleep). The default DRX configurations may save less power as compared to the lower power DRX configuration.

In one configuration, signaling from the UE to the network may allow the UE to toggle between a default power consumption configuration and a lower power consumption configuration. In other words, the UE may communicate a one-bit message to the eNB to toggle (i.e., switch) between the default power consumption configuration and the lower power consumption configuration. The one-bit message may include two possible Boolean values: "0" and "1". In one configuration, the UE may communicate a Boolean value of "1" to toggle between the default power consumption configuration and the lower power consumption configuration. For example, when the UE is operating in the default power consumption configuration, the UE may communicate the Boolean value of "1" to switch to the lower power consumption configuration. As another example, when the UE is operating in the lower power consumption configuration, the UE may communicate the Boolean value of "1" to switch to the default power consumption configuration.

Although the one-bit message communicated between the UE and the eNB contains two possible Boolean values (i.e., "0" and "1"), a single Boolean value (i.e., the Boolean value of "1") may be used to toggle/switch between the preferred power consumption configurations (i.e., the default power consumption configuration and the lower power consumption configuration). Therefore, the UE may use the unused Boolean value of the one-bit message (i.e., the Boolean value of "0" in this example) to indicate a desired change in a DRX reconfiguration to the eNB. In other words, the UE may harvest the unused Boolean value of the toggle-bit (e.g., the Boolean value of "0") to communicate the desired change in DRX configuration to the eNB. Thus, a single bit can be used to both toggle between two different DRX settings, as well as to communicate a desired change in a DRX configuration set by the eNB. In addition, by the UE using the unused Boolean value of "0" in the one-bit message to reconfigure the UE's DRX configuration, the UE may achieve decreased battery power consumption and/or increased quality of service (QoS) performance.

For example, the UE may be using a default DRX configuration. The UE can communicate the Boolean value of "0" to the eNB in order to request the eNB to reconfigure the default DRX configuration with different DRX settings. For example, the eNB may reconfigure the DRX with DRX settings that allow a faster response time and provide a better QoS. Alternatively, when the Boolean value of "0" is received, the eNB can be configured to reconfigure the DRX with DRX settings that provide greater battery life to the UE.

As another example, the UE may be using a lower power DRX configuration. The UE may communicate the Boolean value of "0" to the eNB to request the eNB to reconfigure the lower power DRX configuration. The UE may determine that a reconfiguration is needed to resolve increased battery power consumption and/or a decreased quality of service (QoS) performance. As a result, the UE may communicate the desire to reconfigure its DRX configuration to the eNB.

Figure 3:
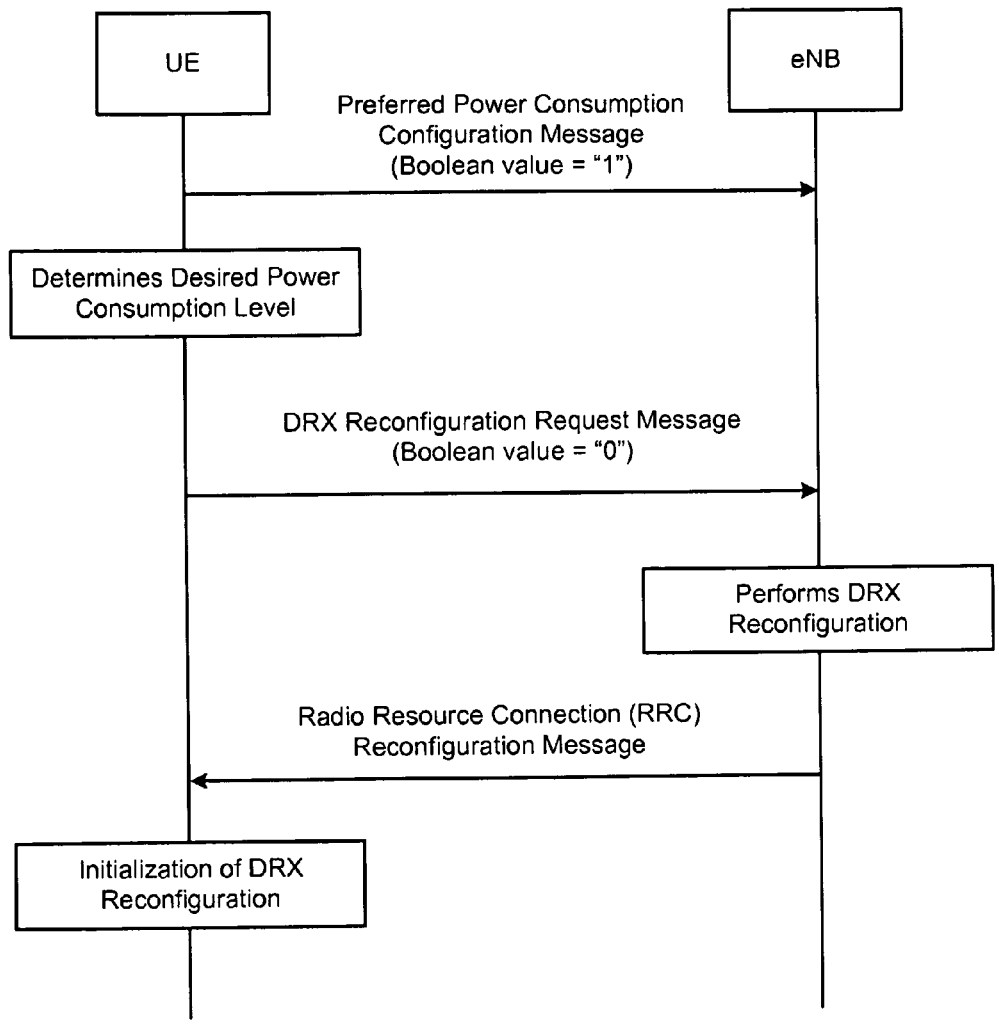
FIG. 3 illustrates a scheme for performing a discontinuous reception (DRX) reconfiguration at a user equipment (UE) in accordance with an example.

FIG. 3 illustrates a scheme for performing a discontinuous reception (DRX) reconfiguration at a user equipment (UE). The UE may communicate a preferred power consumption configuration message to the eNB. In one example, the preferred power consumption configuration message may be a one-bit message that includes a Boolean value of "1" to indicate a preferred power consumption configuration. The UE may communicate the Boolean value of "1" to toggle between the default power consumption configuration and the lower power consumption configuration. Thus, the UE may communicate the Boolean value of "1" to switch from the default power consumption configuration to the lower power consumption configuration, or to switch from the lower power consumption configuration to the default power consumption configuration. In one example, the UE may communicate the preferred power consumption configuration message as part of a UE assistance information message.

In one configuration, the UE may determine a desired power consumption level. For example, the UE may determine an increased level of battery power consumption and/or a decreased quality of service (QoS) performance is desired. The desired power consumption level may be a reduced power consumption level of the UE. Therefore, the UE may determine to reconfigure its DRX configuration in order to achieve the reduced power consumption level.

The UE may communicate a DRX reconfiguration request message to the eNB. In one example, the DRX reconfiguration request message may be the one-bit message that includes a Boolean value of "0" to indicate the DRX reconfiguration. The UE may communicate the eNB to reconfigure the UE's default DRX configuration. In addition, the UE may communicate the Boolean value of "0" to request the eNB to reconfigure the UE's lower power DRX configuration. The UE may communicate the Boolean value of "0" to the eNB using the UE assistance information message. As previously discussed, the reconfiguration of the UE's default DRX configuration or the lower power DRX configuration may reduce the power consumption level of the UE.

The eNB may receive the DRX reconfiguration request message from the UE. The eNB may determine to reconfigure the UE's DRX configuration by adjusting at least one of: an inactivity timer, ON duration, short cycle, long cycle, and a number of consecutive short cycles.

Alternatively, the eNB may determine to not reconfigure the UE's DRX configuration. In one example, the eNB may reconfigure the UE's lower power DRX configuration by decreasing an activity timer, decreasing a number of short cycle repetitions before the long cycle starts, and/or increasing the length of a long cycle (e.g., increasing the long cycle from sf80 to sf320). In another example, the eNB may reconfigure the UE's default DRX configuration by increasing an inactivity timer, increasing a number of short cycle repetitions, and/or decreasing the length of the long cycle. Therefore, when reconfiguring the default DRX configuration, the eNB may change the short DRX cycle value from a value, such as sf2, to a value such as sf10. The example values are not intended to be limiting.

The eNB may reconfigure the DRX configuration, and then communicate a Radio Resource Connection (RRC) reconfiguration message to the UE. The RRC reconfiguration message may contain a request to reinitialize or restart the UE's DRX configuration. In other words, the request to reinitialize or restart the DRX configuration may indicate, to the UE, that the eNB reconfigured the UE's DRX configuration. In response to the request to reinitialize the DRX configuration, the UE may reinitialize the DRX configuration. As a result, the UE may use the reconfigured DRX parameters (e.g., decreased activity timer, increased length of long cycle) to provide the reduced power consumption level.

In one configuration, the UE may communicate consecutive "0"s to the eNB to reconfigure the UE's DRX configuration. For example, the UE may communicate a first "0" to reconfigure its lower power DRX configuration, and then subsequently communicate a second "0" to further reconfigure the lower power DRX configuration. This can allow the UE to use the Boolean value to continually request a lower power (or higher power) DRX setting to provide lower battery power consumption or better QoS performance until the eNB communicates a DRX setting that is sufficient. However, in one embodiment the UE may not communicate a second "0" to the eNB until expiry of a timer (e.g., timer T340). When the timer has expired, the UE may communicate the second "0" to the eNB. In one example, the eNB may limit the number of DRX reconfiguration request messages communicated, from the UE, to the eNB. For example, the eNB may disable the UE's ability to communicate DRX reconfiguration request messages after the UE communicates a defined number of DRX reconfiguration request messages to the eNB.

Figure 4:
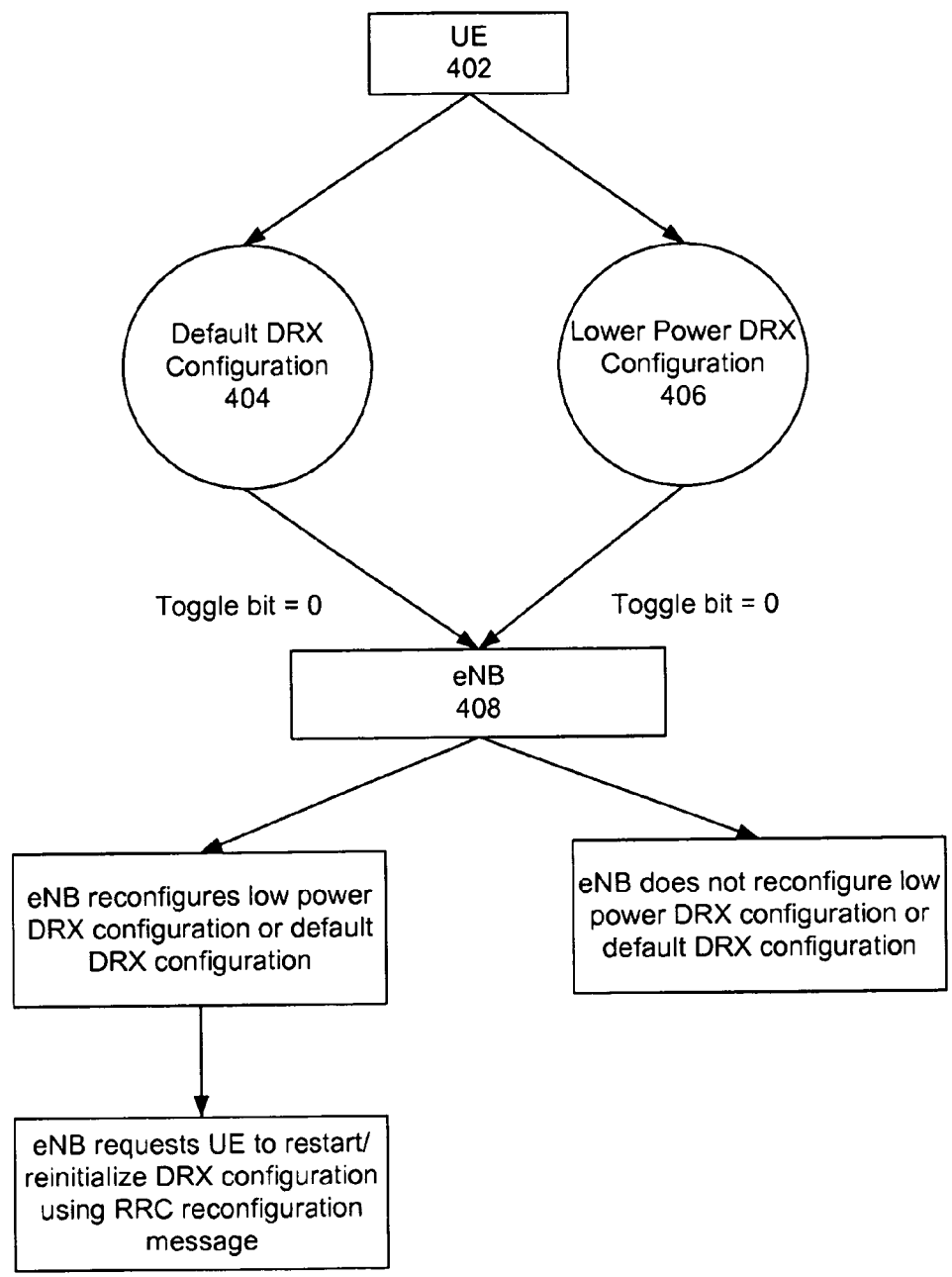
FIG. 4 illustrates a state diagram that includes a discontinuous reception (DRX) reconfiguration at a user equipment (UE) in accordance with an example.

FIG. 4 illustrates a state diagram that includes a discontinuous reception (DRX) reconfiguration at a user equipment (UE) 402. The UE may be operating in a default DRX configuration 404 or a lower power DRX configuration 406. The UE 402 may communicate a one-bit message containing a Boolean value of "0" to the eNB 408. The Boolean value of "0" may indicate the UE's request for a DRX reconfiguration. In one example, the UE 402 may communicate the Boolean value of "0," while operating in the default DRX configuration 404, in order to reconfigure the default DRX configuration 404. In other words, the UE 402 may communicate a toggle bit=0 to the eNB 408. Alternatively, the UE 402 may communicate the Boolean value of "0," while operating in the lower power DRX configuration 404, in order to reconfigure the lower power DRX configuration 404. The UE's request to reconfigure its DRX configuration may be communicated to the eNB 408 in a preferred power consumption configuration message. In one example, the UE's preferred power consumption configuration may be included as part of a UE assistance information message.

The eNB 408 may receive a DRX reconfiguration request message (i.e., the Boolean value of "0") from the UE 402. The eNB 408 may determine whether to grant the UE's request for the DRX reconfiguration. In one example, the eNB 408 may determine to not reconfigure the UE's DRX configuration. Alternatively, the eNB 408 may determine to reconfigure the default DRX configuration 404 or the lower power DRX configuration 406 (depending on the DRX configuration of the UE 402 when the UE 402 communicated the Boolean value of "0" to the eNB 408).

The eNB 408 may reconfigure the UE's DRX configuration by adjusting at least one of: an inactivity timer, ON duration, short cycle, long cycle, and a number of consecutive short cycles. For example, a reconfiguration of the UE's default DRX configuration 404 may result in a longer inactivity timer, a higher number of short cycle repetitions, and a shorter length of long cycles. In addition, a reconfiguration of the UE's lower power DRX configuration 406 may result in a shorter inactivity timer, a smaller number of short DRX cycle repetitions before the long DRX cycle starts, and longer long DRX cycles. The eNB 408 can be configured to know whether the received Boolean value is to increase or decrease the UE's power consumption or to increase the QoS.

The eNB 408 may request the UE 402 to restart or reinitialize the DRX configuration (either the default DRX configuration 404 or the lower power default DRX configuration) using a Radio Resource Connection (RRC) Reconfiguration message. In other words, the UE 402 may determine that the eNB 408 reconfigured the UE's DRX configuration upon receiving the request to reinitialize the DRX configuration from the eNB 408.

In one example, after the UE 402 communicates the Boolean value of "0" to the eNB 408, the UE 402 may remain in its present DRX configuration until the request to reinitialize the DRX configuration is received from the eNB 408. Thereafter, the UE 402 may restart or reinitialize its previous DRX configuration in order to operate in the DRX reconfiguration.

FIG. 5 illustrates an abstract syntax notation (ASN) code example of various discontinuous reception (DRX) parameters. The DRX parameters may be included in a DRX Configuration Information Element (IE). The DRX parameters shown in FIG. 5 may be further described in 3GPP Technical Specification (TS) 36.331. The onDurationTimer can be selected to have a value from a single subframe up to 200 subframes in this example. Similarly, the DRX-Inactivity-Timer allows selections from one subframe to 2560 subframes, with 9 spare locations to allow other selections. The DRX-Retransmission timer can be selected from 1 subframe to 33 subframes. The longDRX-CycleStartOffset allows an offset to be selected in the Long DRX cycle that is anywhere from the first (i.e. 0) subframe, up to subframe 2559. The shortDRX-Cycle can be selected to have a length from 2 subframes up to 640 subframes. A DRXShortCycleTimer can be selected to be an integer of the shortDRX-Cycle.

Figure 6:
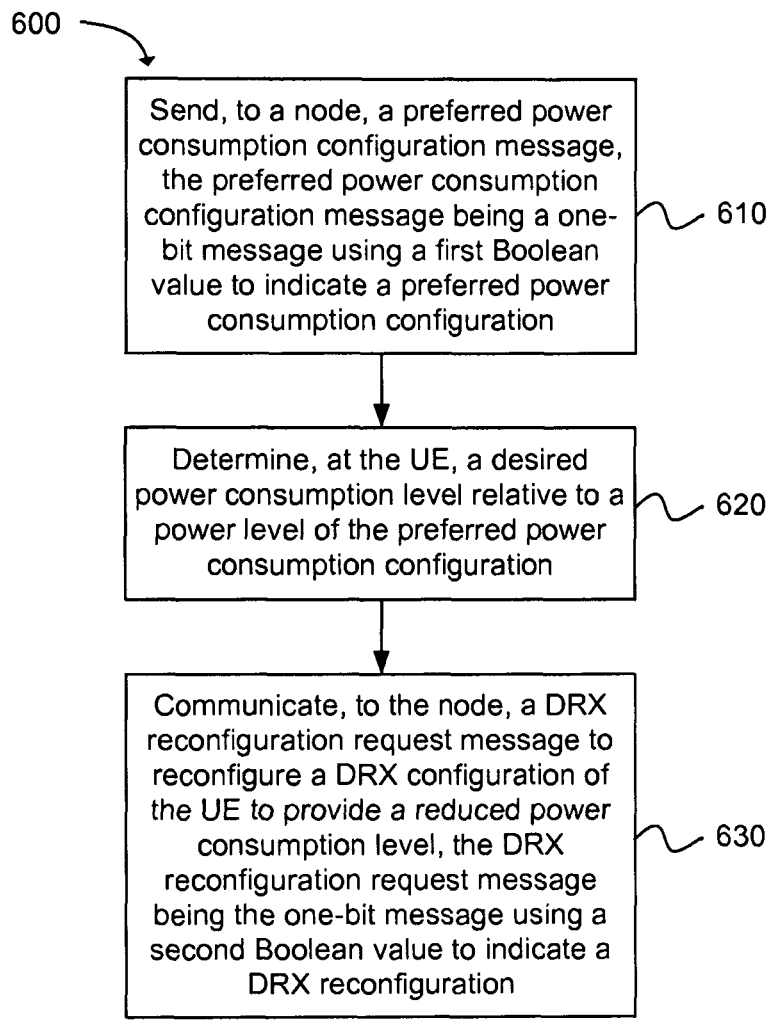
FIG. 6 depicts functionality of computer circuitry of a user equipment (UE) operable to communicate a discontinuous reception (DRX) reconfiguration in accordance with an example.

Another example provides functionality 600 of computer circuitry of a user equipment (UE) operable to communicate a discontinuous reception (DRX) reconfiguration, as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to send, to a node, a preferred power consumption configuration message, the preferred power consumption configuration message being a one-bit message using a first Boolean value to indicate a preferred power consumption configuration, as in block 610. The computer circuitry can be further configured to determine, at the UE, a desired power consumption level relative to a power level of the preferred power consumption configuration, as in block 620. The computer circuitry may be also configured to communicate, to the node, a DRX reconfiguration request message to reconfigure a DRX configuration of the UE to provide a reduced power consumption level, the DRX reconfiguration request message being the one-bit message using a second Boolean value to indicate a DRX reconfiguration, as in block 630.

In one example, the computer circuitry can be further configured to receive, from the node, a Radio Resource Connection (RRC) reconfiguration message containing a request to reinitialize the DRX configuration, the request indicating that the eNB reconfigured the DRX configuration of the UE. In addition, the computer circuitry can be further configured to send the preferred power consumption configuration message to toggle between a default power consumption configuration and a lower power consumption configuration.

In one configuration, the computer circuitry can be further configured to send the preferred power consumption configuration message, to the node, in a UE assistance information message. In one example, the first Boolean value to indicate the preferred power consumption configuration is "1" and the second Boolean value to indicate the DRX reconfiguration is "0". In addition, the computer circuitry can be further configured to communicate the DRX reconfiguration request message, to the node, to reconfigure a default DRX configuration of the UE. Furthermore, the computer circuitry can be configured to communicate the DRX reconfiguration request message, to the node, to reconfigure a lower power DRX configuration of the UE.

In one example, the DRX configuration is reconfigured, at the UE, by adjusting at least one of: an inactivity timer, ON duration, short cycle, long cycle, and a number of consecutive short cycles. In addition, the UE includes an antenna, a touch sensitive display screen, a speaker, a microphone, a graphics processor, an application processor, internal memory, or a non-volatile memory port. Furthermore, the node can be selected from a group consisting of a base station (BS), a Node B (NB), an evolved Node B (eNB), a baseband unit (BBU), a remote radio head (RRH), a remote radio equipment (RRE), or a remote radio unit (RRU).

Figure 7:
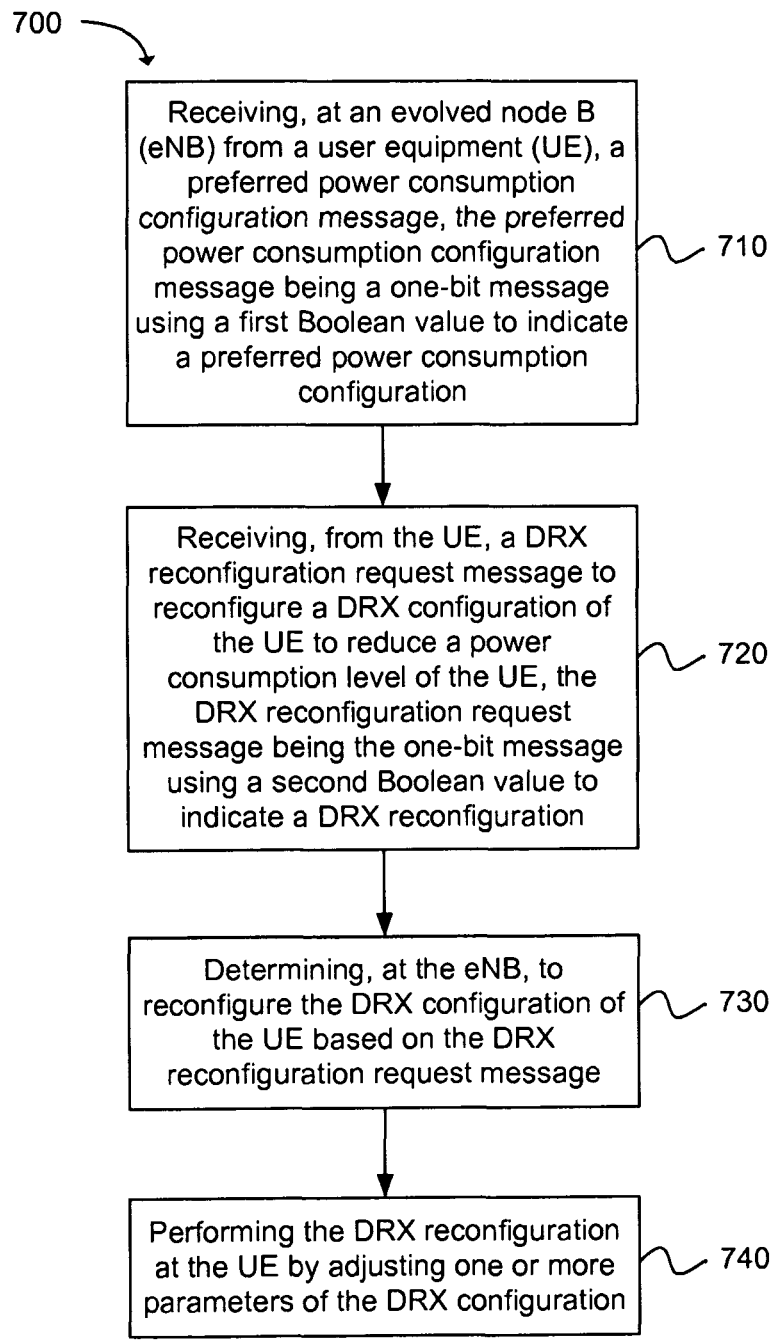
FIG. 7 depicts a flow chart of a method for communicating a discontinuous reception (DRX) reconfiguration in accordance with an example.

Another example provides a method 700 for communicating a discontinuous reception (DRX) reconfiguration, as shown in the flow chart in FIG. 7. The method may be executed as instructions on a machine, where the instructions are included on at least one computer readable medium or one non-transitory machine readable storage medium. The method includes the operation of receiving, at an evolved node B (eNB) from a user equipment (UE), a preferred power consumption configuration message, the preferred power consumption configuration message being a one-bit message using a first Boolean value to indicate a preferred power consumption configuration, as in block 710. The method further includes receiving, from the UE, a DRX reconfiguration request message to reconfigure a DRX configuration of the UE to reduce a power consumption level of the UE, the DRX reconfiguration request message being the one-bit message using a second Boolean value to indicate a DRX reconfiguration, as in block 720. The method also includes determining, at the eNB, to reconfigure the DRX configuration of the UE based on the DRX reconfiguration request message, as in block 730. In addition, the method includes performing the DRX reconfiguration at the UE by adjusting one or more parameters of the DRX configuration, as in block 740.

In one configuration, the method can include communicating, to the UE, a Radio Resource Connection (RRC) reconfiguration message containing a request for the UE to reinitialize the DRX reconfiguration. In addition, the method can include receiving the preferred power consumption configuration message to toggle between a default power consumption configuration and a lower power consumption configuration. Furthermore, the method can include receiving the preferred power consumption configuration message, from the UE, in a UE assistance information message. In one example, the first Boolean value to indicate the preferred power consumption configuration is "1" and the second Boolean value to indicate the DRX configuration is "0".

In one configuration, the method can include receiving the DRX reconfiguration request message, from the UE, to reconfigure a default DRX configuration of the UE. In addition, the method can include receiving the DRX reconfiguration request message, from the UE, to reconfigure a lower power DRX configuration of the UE. Furthermore, the method can include performing the DRX reconfiguration at the UE by adjusting at least one of: an inactivity timer, ON duration, short cycle, long cycle, and a number of consecutive short cycles.

Figure 8:
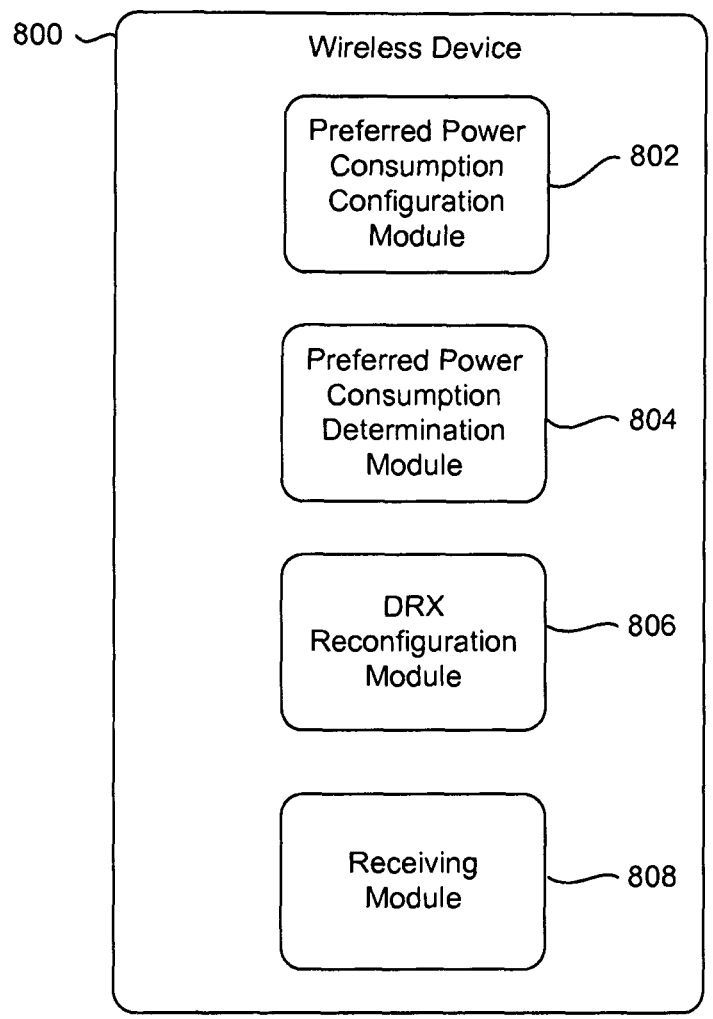
FIG. 8 illustrates a block diagram of a wireless device in accordance with an example.

FIG. 8 illustrates an example wireless device (e.g., a user equipment) 800 that is configured for communicating a discontinuous reception (DRX) reconfiguration, as shown in another embodiment of the present invention. The wireless device comprises a preferred power consumption configuration module 802 that is configured to send, to an evolved node B (eNB), a preferred power consumption configuration message, the preferred power consumption configuration message being a one-bit message using a first Boolean value to indicate a preferred power consumption configuration. A desired power consumption determination module 804 can be configured to determine, at the UE, a desired power consumption level relative to a power level of the preferred power consumption configuration. A DRX reconfiguration module 806 can be configured to communicate, to the eNB, a DRX reconfiguration request message to reconfigure a DRX configuration of the wireless device to provide a reduced power consumption level, the DRX reconfiguration request message being the one-bit message using a second Boolean value to indicate a DRX reconfiguration. In addition, a receiving module 808 can be configured to receive, from the eNB, a Radio Resource Connection (RRC) reconfiguration message containing a request to reinitialize the DRX configuration, the request indicating that the eNB reconfigured the DRX configuration of the wireless device.

In one configuration, the preferred power consumption configuration module 802 can be further configured to send the preferred power consumption configuration message to toggle between a default power consumption configuration and a lower power consumption configuration. In one example, the first Boolean value to indicate the preferred power consumption configuration is "1" and the second Boolean value to indicate the DRX reconfiguration is "0". In addition, the DRX reconfiguration module 806 can be further configured to communicate the DRX reconfiguration message, to the eNB, to reconfigure at least one of: a default DRX configuration or a lower power DRX configuration. In one example, the wireless device is one of a user equipment (UE) and a mobile station (MS) having an antenna, a touch sensitive display screen, a speaker, a microphone, a graphics processor, an application processor, internal memory, or a non-volatile memory port.

Figure 9:
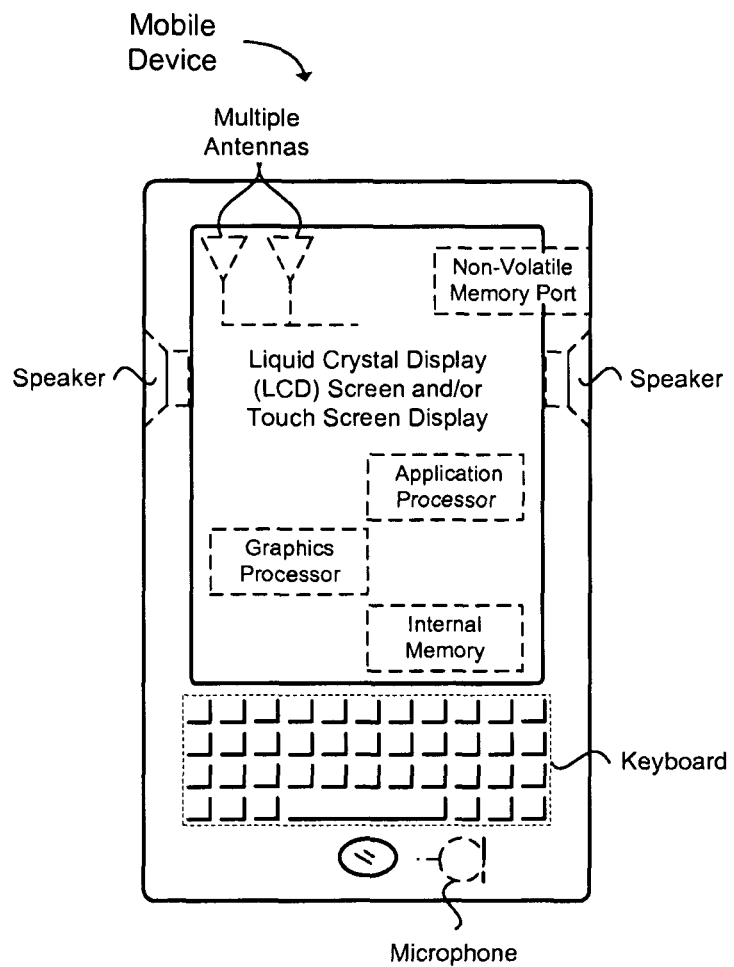
FIG. 9 illustrates a block diagram of a mobile device (e.g., a user equipment) in accordance with an example.

FIG. 9 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to communicate a discontinuous reception (DRX) reconfiguration, the UE having computer circuitry configured to:
    send, to a node, a preferred power consumption configuration message, the preferred power consumption configuration message being a one-bit message using a first Boolean value to indicate a preferred power consumption configuration;
    determine, at the UE, a desired power consumption level relative to a power level of the preferred power consumption configuration; and
    communicate, to the node, a DRX reconfiguration request message to reconfigure a DRX configuration of the UE to provide a reduced power consumption level, the DRX reconfiguration request message being the one-bit message using a second Boolean value to indicate a DRX reconfiguration.

2. The computer circuitry of claim 1, further configured to receive, from the node, a Radio Resource Connection (RRC) reconfiguration message containing a request to reinitialize the DRX configuration, the request indicating that the eNB reconfigured the DRX configuration of the UE.

3. The computer circuitry of claim 1, further configured to send the preferred power consumption configuration message to toggle between a default power consumption configuration and a lower power consumption configuration.

4. The computer circuitry of claim 1, further configured to send the preferred power consumption configuration message, to the node, in a UE assistance information message.

5. The computer circuitry of claim 1, wherein the first Boolean value to indicate the preferred power consumption configuration is "1" and the second Boolean value to indicate the DRX reconfiguration is "0".

6. The computer circuitry of claim 1, further configured to communicate the DRX reconfiguration request message, to the node, to reconfigure a default DRX configuration of the UE.

7. The computer circuitry of claim 1, further configured to communicate the DRX reconfiguration request message, to the node, to reconfigure a lower power DRX configuration of the UE.

8. The computer circuitry of claim 1, wherein the DRX configuration is reconfigured, at the UE, by adjusting at least one of: an inactivity timer, ON duration, short cycle, long cycle, and a number of consecutive short cycles.

9. The computer circuitry of claim 1, wherein the UE includes an antenna, a touch sensitive display screen, a speaker, a microphone, a graphics processor, an application processor, internal memory, or a non-volatile memory port.

10. The computer circuitry of claim 1, wherein the node is selected from a group consisting of a base station (BS), a Node B (NB), an evolved Node B (eNB), a baseband unit (BBU), a remote radio head (RRH), a remote radio equipment (RRE), or a remote radio unit (RRU).

11. A method for communicating a discontinuous reception (DRX) reconfiguration, the method comprising:
- receiving, at an evolved node B (eNB) from a user equipment (UE), a preferred power consumption configuration message, the preferred power consumption configuration message being a one-bit message using a first Boolean value to indicate a preferred power consumption configuration;
- receiving, from the UE, a DRX reconfiguration request message to reconfigure a DRX configuration of the UE to reduce a power consumption level of the UE, the DRX reconfiguration request message being the one-bit message using a second Boolean value to indicate a DRX reconfiguration;
- determining, at the eNB, to reconfigure the DRX configuration of the UE based on the DRX reconfiguration request message; and
- performing the DRX reconfiguration at the UE by adjusting one or more parameters of the DRX configuration.

12. The method of claim 11, further comprising communicating, to the UE, a Radio Resource Connection (RRC) reconfiguration message containing a request for the UE to reinitialize the DRX reconfiguration.

13. The method of claim 11, further comprising receiving the preferred power consumption configuration message to toggle between a default power consumption configuration and a lower power consumption configuration.

14. The method of claim 11, further comprising receiving the preferred power consumption configuration message, from the UE, in a UE assistance information message.

15. The method of claim 11, wherein the first Boolean value to indicate the preferred power consumption configuration is "1" and the second Boolean value to indicate the DRX configuration is "0".

16. The method of claim 11, further comprising receiving the DRX reconfiguration request message, from the UE, to reconfigure a default DRX configuration of the UE.

17. The method of claim 11, further comprising receiving the DRX reconfiguration request message, from the UE, to reconfigure a lower power DRX configuration of the UE.

18. The method of claim 11, further comprising performing the DRX reconfiguration at the UE by adjusting at least one of: an inactivity timer, ON duration, short cycle, long cycle, and a number of consecutive short cycles.

19. A wireless device for communicating a discontinuous reception (DRX) reconfiguration, the wireless device comprising:
- a preferred power consumption configuration module configured to send, to an evolved node B (eNB), a preferred power consumption configuration message, the preferred power consumption configuration message being a one-bit message using a first Boolean value to indicate a preferred power consumption configuration;
- a desired power consumption determination module configured to determine, at the UE, a desired power consumption level relative to a power level of the preferred power consumption configuration; and
- a DRX reconfiguration module configured to communicate, to the eNB, a DRX reconfiguration request message to reconfigure a DRX configuration of the wireless device to provide a reduced power consumption level, the DRX reconfiguration request message being the one-bit message using a second Boolean value to indicate a DRX reconfiguration.

20. The wireless device of claim 19, further comprising a receiving module configured to receive, from the eNB, a Radio Resource Connection (RRC) reconfiguration message containing a request to reinitialize the DRX configuration, the request indicating that the eNB reconfigured the DRX configuration of the wireless device.

21. The wireless device of claim 19, wherein the preferred power consumption configuration module is further configured to send the preferred power consumption configuration message to toggle between a default power consumption configuration and a lower power consumption configuration.

22. The wireless device of claim 19, wherein the first Boolean value to indicate the preferred power consumption configuration is "1" and the second Boolean value to indicate the DRX reconfiguration is "0".

23. The wireless device of claim 19, wherein the DRX reconfiguration module is further configured to communicate the DRX reconfiguration message, to the eNB, to reconfigure at least one of: a default DRX configuration or a lower power DRX configuration.

24. The wireless device of claim 19, wherein the wireless device is one of a user equipment (UE) and a mobile station (MS) having an antenna, a touch sensitive display screen, a speaker, a microphone, a graphics processor, an application processor, internal memory, or a non-volatile memory port.

* * * * *